(12) United States Patent
Mylemans

(10) Patent No.: US 8,601,792 B2
(45) Date of Patent: Dec. 10, 2013

(54) OIL COOLER HAVING ADJUSTABLE HEAT TRANSFER EFFECTIVENESS

(75) Inventor: John A Mylemans, Derby (GB)

(73) Assignee: Rolls-Royce PLC, London (GB)

( * ) Notice: Subject to any disclaimer, the term of this patent is extended or adjusted under 35 U.S.C. 154(b) by 292 days.

(21) Appl. No.: 13/012,228

(22) Filed: Jan. 24, 2011

(65) Prior Publication Data

US 2011/0185731 A1 Aug. 4, 2011

(30) Foreign Application Priority Data

Jan. 29, 2010 (GB) ................................ 1001410.8
May 4, 2010 (GB) ................................ 1007338.5

(51) Int. Cl.
*F02K 99/00* (2009.01)

(52) U.S. Cl.
USPC ............ 60/267; 60/266; 60/604; 60/730; 165/41; 165/44; 165/51; 165/86; 165/96; 244/57

(58) Field of Classification Search
USPC .......... 60/266, 267, 604, 730; 165/41, 44, 51, 165/86, 96; 244/57
See application file for complete search history.

(56) References Cited

U.S. PATENT DOCUMENTS

| | | | | |
|---|---|---|---|---|
| 2,291,607 A | * | 8/1942 | Chausson | 236/35 |
| 5,351,476 A | * | 10/1994 | Laborie et al. | 60/785 |
| 5,438,823 A | * | 8/1995 | Loxley et al. | 60/39.08 |
| 5,987,877 A | | 11/1999 | Steiner | |
| 6,000,210 A | | 12/1999 | Negulescu | |
| 2007/0215326 A1 | * | 9/2007 | Schwarz et al. | 165/96 |
| 2008/0053060 A1 | | 3/2008 | Olver | |
| 2008/0271433 A1 | | 11/2008 | Olver | |
| 2009/0097972 A1 | | 4/2009 | Murphy | |

FOREIGN PATENT DOCUMENTS

| | | |
|---|---|---|
| EP | 1 669 551 A2 | 6/2006 |
| EP | 1 895 124 A2 | 3/2008 |
| GB | 2 131 094 A | 6/1984 |
| WO | WO 2009/140100 A1 | 11/2009 |

OTHER PUBLICATIONS

Search Report issued in GB 1001410.8, dated May 16, 2010.
Search Report issued in GB 1007338.5, dated Sep. 2, 2010.

* cited by examiner

*Primary Examiner* — Gerald L Sung
*Assistant Examiner* — Craig Kim
(74) *Attorney, Agent, or Firm* — Oliff & Berridge, PLC

(57) ABSTRACT

An oil cooler is provided for a wall of an air flow passage of a gas turbine engine. The oil cooler has a heat exchanger with an oil conduit for carrying a flow of heated oil proximal to the wall of the air flow passage. The heat exchanger is arranged to transfer heat from the heated oil to the air flowing through the passage. The oil cooler further has a system for altering the flow of air across the heat exchanger such that the heat transfer effectiveness of the heat exchanger can be adjusted.

17 Claims, 4 Drawing Sheets

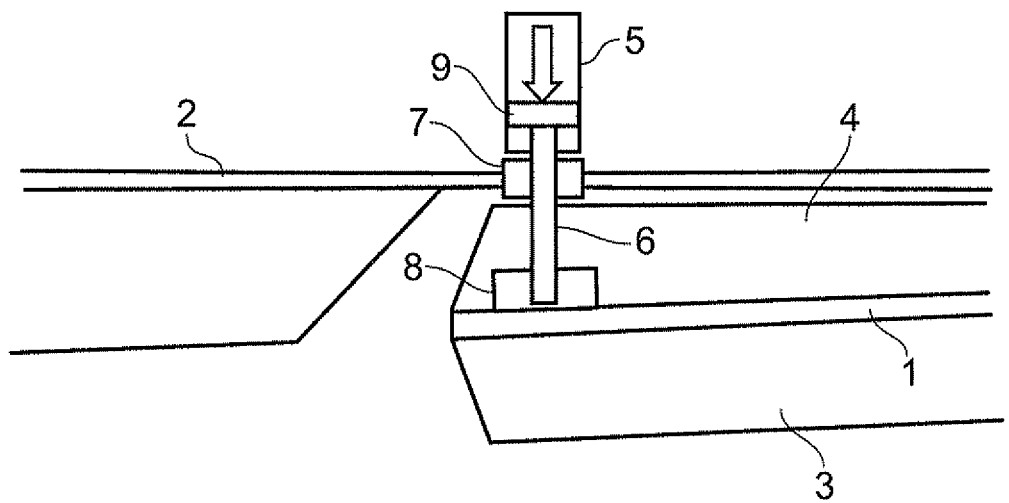
FIG. 5
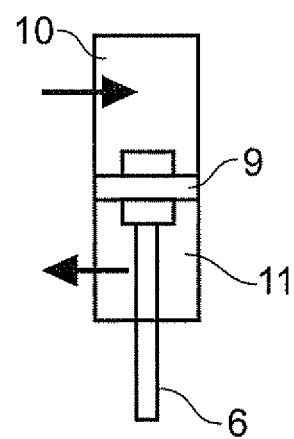 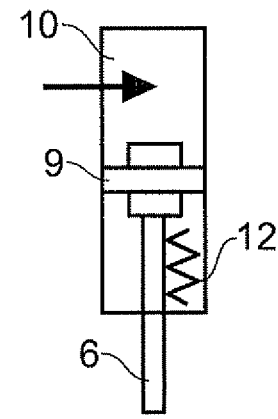
FIG. 6(a)   FIG. 6(b)

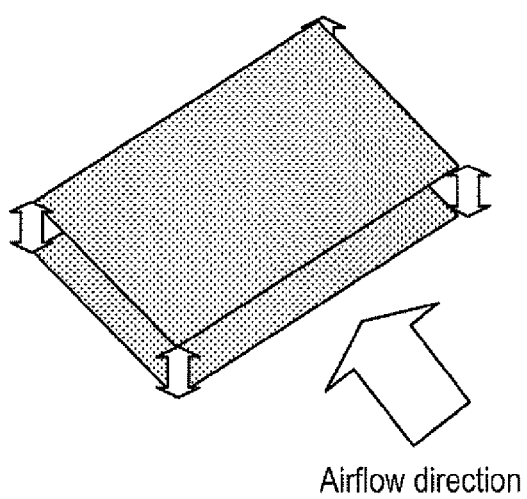
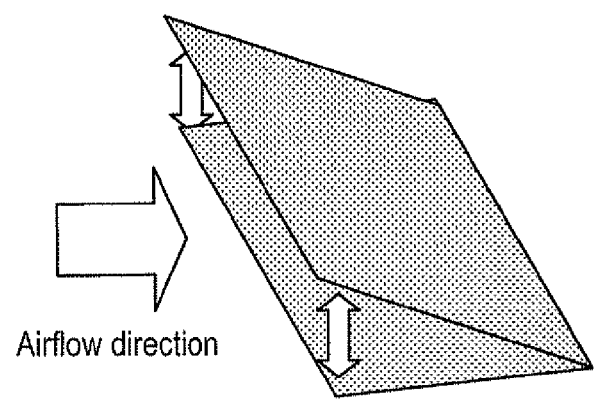
Airflow direction    Airflow direction
FIG. 7(a)                    FIG. 7(b)

OIL COOLER HAVING ADJUSTABLE HEAT TRANSFER EFFECTIVENESS

The present invention relates to an oil cooler which can be mounted to a wall of an air flow passage of a gas turbine engine.

Oil is used in gas turbine engines to lubricate and cool electrical generators, bearings and gears in the transmission system. This results in a large amount of heat being transferred to the oil. In order to maintain the oil, and the components that the oil is cooling, at acceptable temperatures, it is necessary to remove this heat. However, poor management of this heat removal can lead to significant losses in specific fuel consumption.

A turbofan engine oil heat management system is shown schematically in FIG. 1. To manage the heat of the oil in the engine, the oil system is equipped with a surface air oil heat exchanger (SOAHE) and with a fuel oil heat exchanger (FOHE) in sequence. The SOAHE enables heat in the oil to pass to the air flow in the fan bypass duct of the engine and the FOHE enables heat from the oil to pass to the fuel. In principle, dumping heat into the fuel is desirable as the heat is thermodynamically recycled and also heat input into the fuel can prevent fuel icing problems during cold operation. However, the heat dissipation capability of the fuel depends on the fuel flow rate and the maximum fuel temperature limit. As modern aero-engines have high fuel burn efficiency, fuel flow to the burners is significantly reduced, and the fuel flow alone is insufficient to maintain oil cooling at some engine operation conditions. Hence additional oil cooling is provided by the SAOHE. However, to reduce performance losses, oil is allowed to bypass the SOAHE through a route controlled by an oil bypass valve under conditions where there is sufficient heat sink in the fuel. The bypass valve can be electronically controlled according to a valve position controller which takes temperature readings from the oil pumped from the engine and the fuel pumped into the engine.

FIG. 2 shows superimposed graphs of fuel temperature, engine speed, and valve position, all against time for an oil heat management system of the type shown in FIG. 1. The oil bypass valve is open at the engine start to dissipate all oil heat into fuel and subsequently closed at about 20 minutes to dissipate additional heat into the air via SAONE when the fuel temperature reaches about 100° C. The valve is closed again for a short period at about 39 to 42 minutes when the fuel temperature drops.

Usually the SAONE cooler is mounted on the inner surface of the fan bypass duct. A typical configuration of such a cooler is shown in FIG. 3. The cooler 102 is mounted at a wall 104 of the duct, and has a fin and plate construction with air fins both at inner 112 and outer 114 sides and with the oil passing twice through a central plate 110 in a cross-flow pattern. An airflow (arrows A) is conveyed along the fan bypass duct, and respective portions (arrows B and C) pass over the air fins to cool oil passing through the central plate 110. In such an arrangement, airflow B over the inner fins 112 tends to be greater than airflow C over the outer fins 114.

In this typical configuration, the SAOHE cooler is sized to the maximum heat exchange duty required and its position is fixed. For off design conditions, the cooler dissipates more heat than is needed, leading to a fuel temperature which is lower than the target fuel temperature. In addition, although the cooler can be bypassed when the additional air cooling is not needed, the cooler still protrudes into the fan main air stream and causes unnecessary engine performance loss.

An object of the present invention is to provide an oil cooler having a heat exchanger that is mountable to a wall of an air flow passage of a gas turbine engine, the oil cooler allowing improved heat exchange performance to be obtained.

In a first aspect of the invention, there is provided an oil cooler for mounting to a wall of an air flow passage of a gas turbine engine, the oil cooler having:
- a heat exchanger with an oil conduit for carrying a flow of heated oil proximal to the wall of the air flow passage, the heat exchanger being arranged to transfer heat from the heated oil to the air flowing through the passage; and
- a system for altering the flow of air across the heat exchanger such that the heat transfer effectiveness of the heat exchanger can be adjusted.

Through this arrangement, the airflow around the heat exchanger can be altered in order to increase or decrease the heat transfer characteristic of the oil cooler. The heat exchange characteristic of the cooler can be varied at a given engine operating condition. This can provide basis for improved control of fluid temperatures for oil and fuel systems.

Because the air flow across the heat exchanger can be altered, enhanced heat transfer can be achieved as compared to conventional cooler units. A cooler according to the invention can be made more compact, saving weight and taking up less space on the engine.

The oil cooler of the first aspect may have any one or, to the extent that they are compatible, any combination of the following optional features.

The system may comprise an actuator for changing the position of the heat exchanger relative to the wall of the air flow passage to alter the flow of air across the heat exchanger. Moving the heat exchanger relative to the wall can increase or decrease air flow to the outside of the unit.

The actuator may be any known type of actuator known in the art, for example a mechanical actuator (e.g. worm gear) or shape memory metal. Preferably, the actuator is a hydraulic actuator.

The oil cooler may further have an inlet duct through which the flow of air arrives at the heat exchanger, and the system may then comprise a device for changing the amount of flow through the inlet duct to alter the flow of air across the heat exchanger. Additionally, or alternatively, the oil cooler may further have an outlet duct through which the flow of air leaves the heat exchanger, and the system may then comprise a device for changing the amount of flow through the outlet duct to alter the flow of air across the heat exchanger.

The device for changing the amount of flow through an inlet or outlet duct can be, for example, a door or flap which is moveable to controllably open and close the duct, or a device for articulating the duct such that it receives more or less flow.

The heat exchanger may be any known type of heat exchanger. Preferably, the heat exchanger is a plate and fin type heat exchanger.

The oil cooler may have one or more temperature sensors, with the system being operatively connected to the, or each, temperature sensor such that the system alters the flow of air across the heat exchanger (e.g. by an actuator which changes the position of the heat exchanger and/or by a device which changes the amount of flow through an inlet or outlet duct), depending on the temperature sensed by the temperature sensor.

In this way, air flow across the heat exchanger can be altered to change the heat transfer characteristic of the cooler in response to a given engine operating condition, for example, to increase the cooling of oil within the engine or to increase heating of fuel entering the engine.

Preferably, altering the air flow across the heat exchanger in response to temperature sensed by the temperature sensor may take into account secondary effects that may arise as a result of disturbance of the fan stream by e.g. a moved heat exchanger and/or by changed flow through an inlet or outlet duct. However, any such disturbance is likely to be relatively small.

Typically, the oil cooler has at least one temperature sensor which detects the temperature of the oil within the gas turbine engine. In this way, the heat transfer characteristic of the cooler can be changed in response to temperature of the oil within the system.

In some cases, the oil cooler has at least one temperature sensor which detects the temperature of fuel being sent for combustion by the gas turbine engine. For example, the fuel may be heated by the oil, which is in turn cooled by the oil cooler.

Typically, the system alters the air flow across the heat exchanger when the sensed temperature is outside a pre-set range. In this way, a heat exchanger according to the invention can enable active control of critical temperatures in oil and/or fuel systems to within target levels, rather than sizing the heat exchanger for worst case conditions and accepting compromised temperature levels at other conditions.

For example, the system can increase the air flow across the heat exchanger (e.g. the heat exchanger can be moved away from the wall of the air flow passage and/or flow can be increased through an inlet or outlet duct) in response to a sensed temperature above a threshold level to increase the heat exchange effectiveness of the heat exchanger. The system can decrease the air flow across the heat exchanger (e.g. the heat exchanger can be moved towards the wall of the air flow passage and/or flow can be decreased through an inlet or outlet duct) in response to a sensed temperature below a threshold level to decrease the heat exchange effectiveness of the heat exchanger.

In cases where the system comprises an actuator for changing the position of the heat exchanger and the heat exchanger has a leading edge and a trailing edge, relative to the direction of air flowing through the passage, the position of the heat exchanger may be changed by moving the leading and/or trailing edge. For example, the heat exchanger can be pivoted about one of the leading and trailing edges to move the other of the leading and trailing edges into or out of the passage. Alternatively, the entire heat exchanger can be translated into or out of the passage.

Typically, the oil conduit carries the flow of heated oil in a layer substantially parallel to the wall of the air flow passage and the heat exchanger has a plurality of air fins projecting away from the conduit to transfer heat from the oil to the air flowing through the passage.

In some cases, the oil cooler has a plurality of heat exchangers across which the flow of air is alterable. For example, the system for altering the flow of air across the heat exchanger can then comprise a plurality of respective actuators for changing the positions of the heat exchangers, and/or a plurality of respective inlet or outlet ducts with devices for changing the amount of flow there-through. Alternatively, or additionally, the oil cooler may have one or more heat exchangers whose heat transfer effectivenesses are not adjustable. For example whose positions are fixed, relative to the wall of the air flow passage.

Preferably, the oil cooler is mountable in a fan bypass duct of the gas turbine engine.

The oil cooler may be for location at a wall of the bypass duct of a turbofan gas turbine engine.

In a second aspect, the invention provides a gas turbine engine having an air flow passage, an oil cooler according to the previous aspect being mounted to a wall of the air flow passage. For example, the gas turbine engine may be a turbofan gas engine, and the airflow passage may be the bypass duct of the engine.

In a third aspect, the invention provides a method of operating the gas turbine engine of the second aspect, the method comprising the step of: altering the flow of air across the heat exchanger to adjust the heat transfer effectiveness of the heat exchanger, for example in response to a sensed temperature (e.g. a fuel or oil temperature) being outside a pre-set range.

Embodiments of the invention will now be described by way of example with reference to the accompanying drawings in which:

FIG. 5 shows a schematic side view of the leading edge of the oil cooler of FIG. 4;

Figure 1:
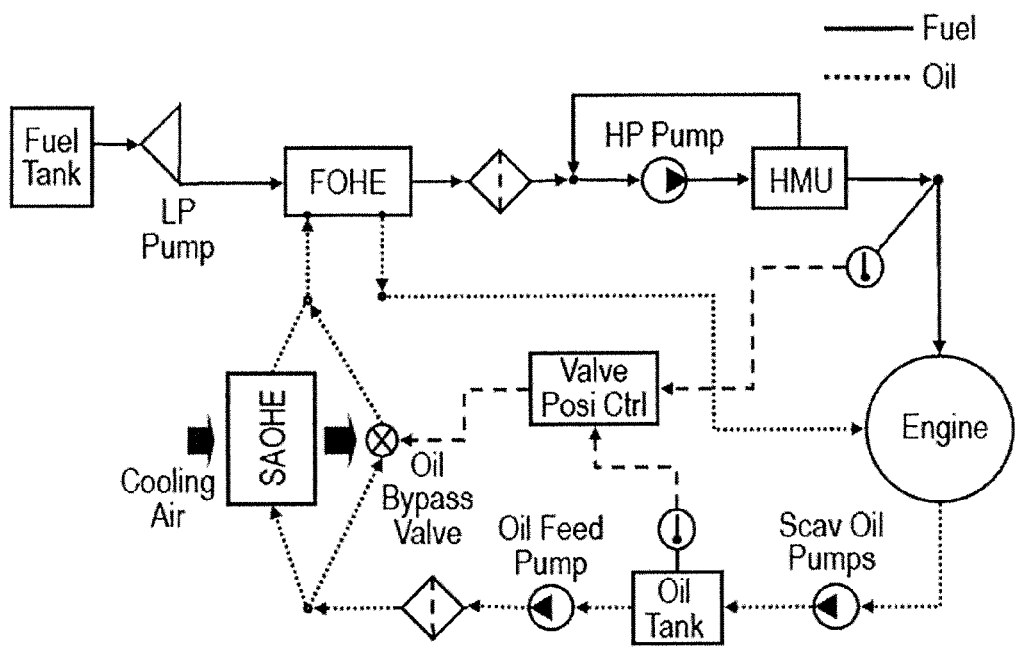
FIG. 1 shows a schematic diagram of a typical turbofan engine oil heat management system.
Figure 2:
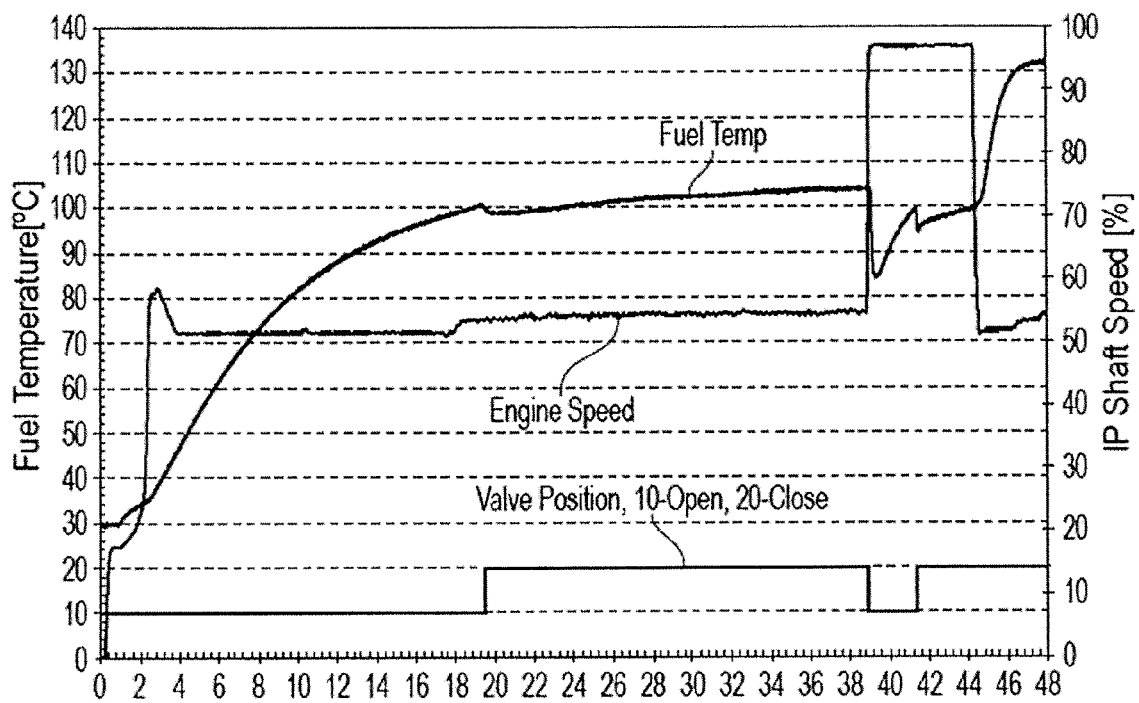
FIG. 2 shows superimposed graphs of fuel temperature, engine speed, and valve position, all against time for an oil heat management system of the type shown in FIG. 1.
Figure 3:
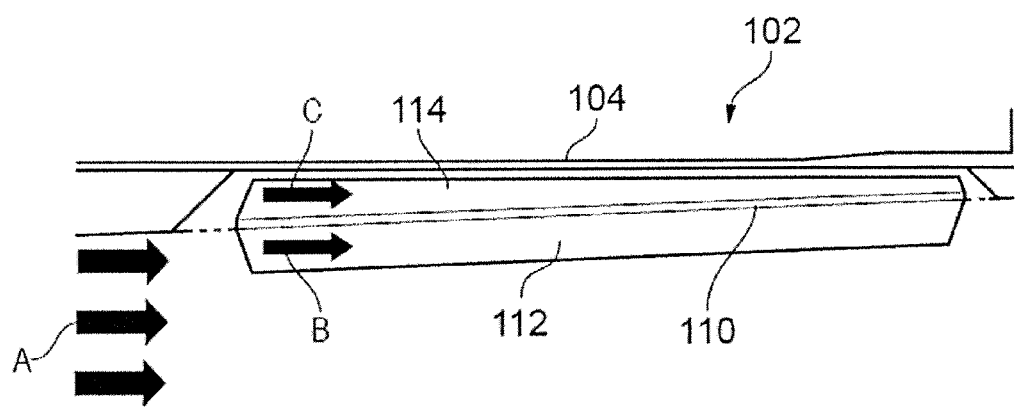
FIG. 3 shows a schematic side view of a conventional air-cooled oil cooler, mounted on the inner surface of a fan bypass duct.
Figure 4:
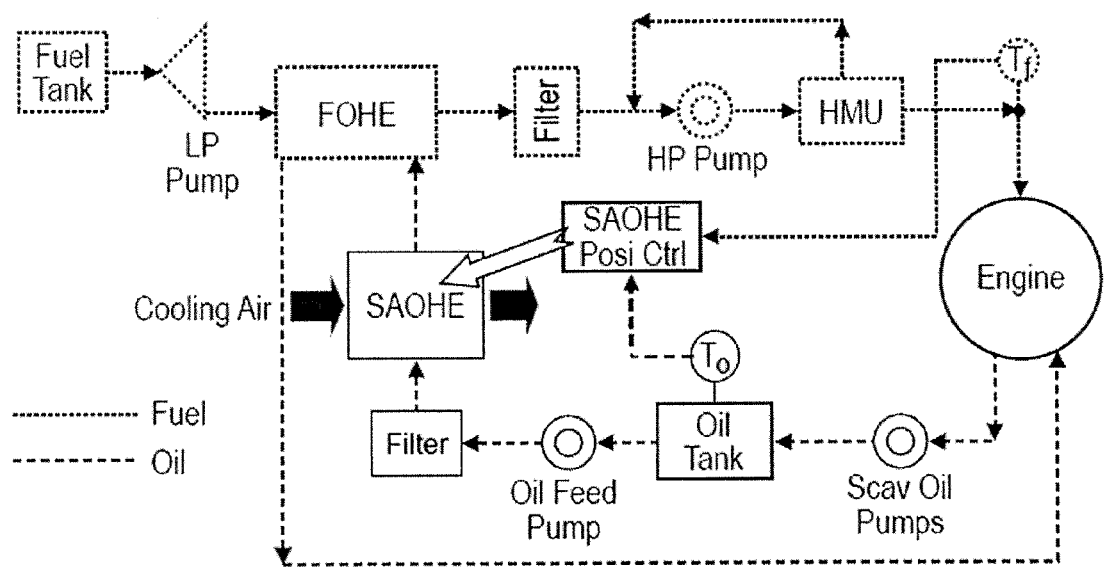
FIG. 4 shows a schematic diagram of a general engine heat management system that includes an oil cooler according to an embodiment of the invention.

FIGS. 6(a) and (b) shows schematically respective versions of a hydraulic actuator for the oil cooler of FIG. 4; and FIG. 7 shows a schematic illustration of options for movement of the oil cooler of FIG. 4.

FIG. 4 shows a layout of a gas turbine engine heat management system that includes an oil cooler according to the invention. In the system, heated oil from the engine is pumped by scavenger pumps into an oil tank. Oil is pumped out from the oil tank through a filter into a surface air-oil heat exchanger (SAOHE). Oil exiting the SAOHE is transferred to a fuel oil heat exchanger (FOHE) before returning to the engine.

The system includes a positional controller (SAOHE Posi. Ctrl.) which receives inputs from a temperature sensor, $T_o$, in the oil tank. The positional controller also receives inputs from a temperature sensor, $T_f$, located within the fuel system, upstream of the engine. The positional controller is operably connected to an actuator which controls the position of the SAOHE. When either or both of the temperature sensors senses a temperature out of a pre-set range for the engine operating condition, the positional controller moves the SAOHE to enhance or reduce the heat transfer effectiveness of the SAOHE and bring the temperature back into range.

FIG. 5 shows a schematic side view of the leading edge of the SAOHE of FIG. 4. The SAOHE is of the fin-plate type and has an oil conduit 1 (in the form of a plate) for carrying the heated oil. The SAOHE is mounted to an inner surface of an outer wall 2 of the fan bypass duct. Oil flows through the conduit in cross-flow directions relative to the direction of air flow through the duct. The SAOHE has a plurality of spaced, side-by-side inner 3 and outer 4 air fins at respective sides of the oil conduit. The fins transfer heat from the oil to the air flowing through the duct.

The SAOHE is movable within the fan bypass duct by one or more actuators 5 which exert hydraulic pressure on the mounting structure of the heat exchanger to move it away from, or towards, the wall 2 of the fan bypass duct. The SAONE is therefore moved further into, or out of, the airflow passage of the fan bypass duct. This increases or decreases airflow around the SAONE, and correspondingly changes the heat transfer effectiveness of the SAOHE. At one extreme, the SAOHE may be underflush to surrounding structures on the wall of the duct, such as acoustic panels, and at the other extreme the SAOHE may protrude into the airstream through the duct relative to surrounding structures.

The SAOHE is mounted to the wall 2 at the, or each, actuator 5 by a mounting arm 6 which passes through the wall at a sealing ring 7. A pad 8 at the inner end of the arm contacts the leading edge of the plate 1. The outer end of the arm terminates in a piston 9 within a cylinder of the actuator. The actuator is thus able to exert a hydraulic force on the piston and thence on the leading edge of the plate 1 in order to move the SAOHE away from or towards the wall of the duct to vary the heat exchange effectiveness of the unit. For example, by moving the leading edge away from the wall of the duct, airflow to the outer air fins 4 is increased, thereby increasing the heat exchange effectiveness.

In one version of the actuator 5, the piston 9 is moved back and forth by varying the fluid pressure in fluid chambers 10, 11 formed to either side of the piston, as shown schematically in FIG. 6(a). In another version of the actuator, shown schematically in FIG. 6(b), the piston is moved back and forth by varying the fluid pressure in a fluid chamber 10 formed on one side of the piston, a spring 12 providing a bias on the other side of the piston.

Another option for the actuator is for mechanical rather than hydraulic actuation. For example, the arm 6 can be moved by a lever or a worm gear. Alternatively, an element formed from a shape memory alloy can move the arm.

FIGS. 7(a) and (b) show schematically two options for moving the SAOHE, which is simply represented as a rectangle. In FIG. 7(a), the entire SAOHE is moved away from the wall 2 of the duct upon which the SAOHE is mounted. In FIG. 7(b), the leading edge of the SAOHE is moved away from the wall of the duct, the SAOHE pivoting about its trailing edge.

To summarise, enhanced and adjustable performance of the SAOHE, can be achieved through articulating the unit relative to the wall 2 of the fan duct, e.g. between underflush and protruding states. This changes the heat transfer effectiveness of the unit and so allows the heat exchange to be varied at a given engine operating condition. This in turn provides a basis for improved control of fluid temperatures for oil and fuel systems.

While the invention has been described in conjunction with the exemplary embodiments described above, many equivalent modifications and variations will be apparent to those skilled in the art when given this disclosure. For example, instead of, or in addition to, the one or more actuators 5 which exert hydraulic pressure on the mounting structure of the heat exchanger to move it away from, or towards, the wall 2 of the fan bypass duct, an inlet or an outlet duct of the heat exchanger may have a device for changing the amount of flow through the duct and thereby altering the flow of air across the heat exchanger. The device can be operably connected to the SAOHE positional controller in the same way that the actuator is operably connected to the controller. Accordingly, the exemplary embodiments of the invention set forth above are considered to be illustrative and not limiting. Various changes to the described embodiments may be made without departing from the spirit and scope of the invention.

The invention claimed is:

1. A gas turbine engine comprising an air flow passage and an oil cooler mounted to a wall of the air flow passage, the oil cooler including:

a heat exchanger with an oil conduit for carrying a flow of heated oil proximal to the wall of the air flow passage, the heat exchanger being arranged to transfer heat from the heated oil to air flowing through the air flow passage, the heat exchanger being disposed entirely on a side of the wall of the air flow passage that contacts the air flowing through the passage; and a system for altering the flow of air across the heat exchanger, the system including an actuator for changing a position of the heat exchanger relative to the wall of the air flow passage, such that the heat transfer effectiveness of the heat exchanger can be adjusted.

2. The gas turbine engine according to claim 1, the oil cooler further including at least one temperature sensor, said system being operatively connected to each of the at least one temperature sensor such that said system alters the flow of air across the heat exchanger depending on the temperature sensed by the at least one temperature sensor.

3. The gas turbine engine according to claim 2, the oil cooler having at least one temperature sensor which detects the temperature of the oil within the gas turbine engine.

4. The gas turbine engine according to claim 2, the oil cooler having at least one temperature sensor which detects the temperature of fuel being sent for combustion by the gas turbine engine.

5. The gas turbine engine according to claim 2, wherein said system alters the flow of air across the heat exchanger when the sensed temperature is outside a pre-set range.

6. The gas turbine engine according to claim 1, wherein the heat exchanger has a leading edge and a trailing edge relative to the direction of air flowing through the passage, the position of the heat exchanger being changed by moving at least one of the leading or trailing edge.

7. The gas turbine engine according to claim 1, wherein the oil cooler further has an inlet duct through which the flow of air arrives at the heat exchanger, and the system comprises a device for changing the amount of flow through the inlet duct to alter the flow of air across the heat exchanger.

8. The gas turbine engine according to claim 1, wherein the oil cooler further has an outlet duct through which the flow of air leaves the heat exchanger, and the system comprises a device for changing the amount of flow through the outlet duct to alter the flow of air across the heat exchanger.

9. The gas turbine engine according to claim 1, wherein the oil conduit carries the flow of heated oil in a layer substantially parallel to the wall of the air flow passage, the heat exchanger having a plurality of air fins projecting away from the conduit to transfer heat from the oil to the air flowing through the passage.

10. The gas turbine engine according to claim 1, wherein the oil cooler has a plurality of said heat exchangers.

11. The gas turbine engine according to claim 1, wherein the oil cooler further has one or more additional heat exchangers whose heat transfer effectivenesses are not adjustable.

12. The gas turbine engine according to claim 1, wherein the oil cooler is mountable in a fan bypass duct.

13. A method of operating the gas turbine engine of claim 1, the method comprising the step of: altering the flow of air across the heat exchanger to adjust the heat transfer effectiveness of the heat exchanger.

14. The gas turbine engine according to claim 1, wherein the actuator is configured to change a spacing between at least a part of the heat exchanger and the wall of the air flow passage.

15. The gas turbine engine according to claim 1, wherein the oil cooler has a leading edge and a trailing edge relative to the direction of air flowing through the passage, and the actuator is configured to change the position of the heat exchanger by moving only the leading edge.

16. The gas turbine engine according to claim 1, wherein the air flow passage is configured such that air flowing through the passage only contacts the side of the wall on which the heat exchanger is disposed.

17. A gas turbine engine comprising an air flow passage and an oil cooler mounted to a wall of the air flow passage, the oil cooler including:
- at least one temperature sensor;
- a heat exchanger with an oil conduit for carrying a flow of heated oil proximal to the wall of the air flow passage, the heat exchanger being arranged to transfer heat from the heated oil to air flowing through the air flow passage, the heat exchanger being disposed entirely on a side of the wall of the air flow passage that contacts the air flowing through the passage; and
- a system for altering the flow of air across the heat exchanger, the system including an actuator for changing a position of the heat exchanger relative to the wall of the air flow passage, such that the heat transfer effectiveness of the heat exchanger can be adjusted, the system being operatively connected to each of the at least one temperature sensor such that said system alters the flow of air across the heat exchanger depending on the temperature sensed by the at least one temperature sensor.

* * * * *